(12) United States Patent
Alderman et al.

(10) Patent No.: US 10,071,822 B2
(45) Date of Patent: Sep. 11, 2018

(54) METHOD AND SYSTEM FOR AUTOMATED LUGGAGE SECURITY INSPECTION

(71) Applicants: Todd Alderman, Ann Arbor, MI (US); Michael Fleming, Brighton, MI (US); Christopher Murphy, Ann Arbor, MI (US)

(72) Inventors: Todd Alderman, Ann Arbor, MI (US); Michael Fleming, Brighton, MI (US); Christopher Murphy, Ann Arbor, MI (US)

(73) Assignee: JERVIS B. WEBB COMPANY, Farmington Hills, MI (US)

( * ) Notice: Subject to any disclaimer, the term of this patent is extended or adjusted under 35 U.S.C. 154(b) by 113 days.

(21) Appl. No.: 14/881,537

(22) Filed: Oct. 13, 2015

(65) Prior Publication Data
US 2016/0244184 A1 Aug. 25, 2016

Related U.S. Application Data

(60) Provisional application No. 62/120,473, filed on Feb. 25, 2015.

(51) Int. Cl.
*B64F 1/36* (2017.01)
*G01M 99/00* (2011.01)
*G05D 1/02* (2006.01)

(52) U.S. Cl.
CPC ............ *B64F 1/368* (2013.01); *G01M 99/00* (2013.01); *G05D 1/0261* (2013.01);
(Continued)

(58) Field of Classification Search
CPC . B64F 1/368; G01M 99/00; G05D 2201/0216
(Continued)

(56) References Cited

U.S. PATENT DOCUMENTS 5,793,639 A 8/1998 Yamazaki
6,129,026 A 10/2000 LeCroy
(Continued)

FOREIGN PATENT DOCUMENTS

CN 103143510 A * 6/2013
CN 103143510 B 7/2014
(Continued)

OTHER PUBLICATIONS

Machine translation of JP 2008184329.*
(Continued)

*Primary Examiner* — Lisa Caputo
*Assistant Examiner* — Nathaniel T Woodward
(74) *Attorney, Agent, or Firm* — Dickinson Wright PLLC

(57) ABSTRACT

A system and method of operating a checked bag reconciliation area of an airport. The method includes transporting a luggage item from an entrance mechanism to one of a plurality of inspection stations. Once the luggage item is at the inspection station, the method proceeds by conducting an inspection of the luggage item by the agent at the inspection station. The step of transporting the luggage item includes transporting the luggage item to the inspection station with the luggage item disposed on an automatic material handling device, and the step of conducting an inspection of the luggage item by the agent includes conducting the inspection of the luggage item while the luggage item is disposed on the automatic material handling device.

27 Claims, 9 Drawing Sheets

(52) U.S. Cl.
CPC ......... *G05D 1/0265* (2013.01); *G05D 1/0274* (2013.01); *G05D 1/0278* (2013.01); *G05D 1/0297* (2013.01); *G05D 2201/0216* (2013.01)

(58) Field of Classification Search
USPC ........................................................ 73/865.8
See application file for complete search history.

(56) References Cited

U.S. PATENT DOCUMENTS

| | | | |
|---|---|---|---|
| 6,341,430 | B1 | 1/2002 | Carstens et al. |
| 7,343,995 | B2 | 3/2008 | Fukuhara et al. |
| 8,509,945 | B1 | 8/2013 | Snaith et al. |
| 8,930,133 | B2 | 1/2015 | Wurman et al. |
| 8,996,159 | B2 | 3/2015 | Franzen et al. |
| 2005/0177271 | A1 * | 8/2005 | Koren ................ B64F 1/368 700/213 |
| 2010/0299014 | A1 | 11/2010 | Bouvier |

FOREIGN PATENT DOCUMENTS

| | | | | |
|---|---|---|---|---|
| DE | 20111078191 | A1 | | 1/2013 |
| DE | 102011078191 | A1 * | 1/2013 | ............... B07C 3/14 |
| DE | 102014003053 | A1 | | 9/2015 |
| JP | 2008174364 | A | | 7/2008 |
| JP | 2008184329 | A * | 8/2008 | |
| WO | 2012097525 | A1 | | 7/2012 |
| WO | WO 2012097525 | A1 * | 7/2012 | ............... B64F 1/368 |

OTHER PUBLICATIONS

Transportation Security Administration, Planning Guidelines and Design Standards for Checked Baggage Inspection Systems, May 2, 2014, p. 170 noted as 9-2 "9: Checked Baggage Resolution Area Planning Standards", Version 4.2.

* cited by examiner

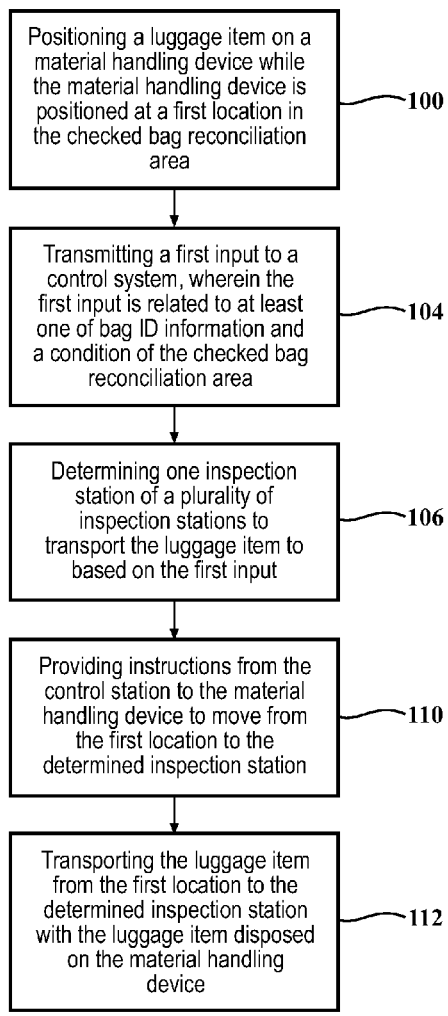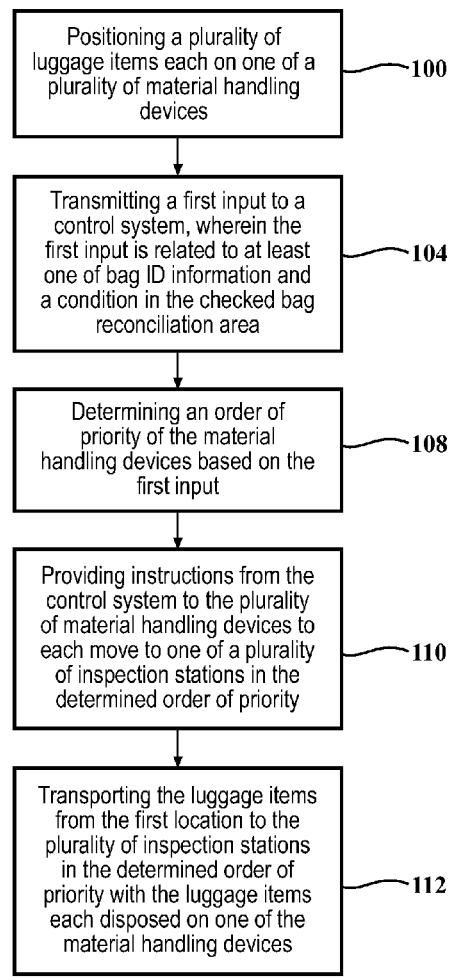
FIG. 10
FIG. 11

METHOD AND SYSTEM FOR AUTOMATED LUGGAGE SECURITY INSPECTION

CROSS REFERENCE TO RELATED APPLICATION

This U.S. patent application claims the benefit of U.S. Provisional Patent Application Ser. No. 62/120,473 filed on Feb. 25, 2015 entitled "Method And Apparatus For Automated Luggage Security Inspection," the entire disclosure of the application being considered part of the disclosure of this application and hereby incorporated by reference.

BACKGROUND OF THE INVENTION

1. Field of the Invention

A method and system for automated luggage security inspection. More particularly, a method and system for controlling an activity area, such as a checked bag reconciliation area, that utilize at least one automatic material handling device, such as an automatic guided vehicle.

2. Description of the Related Art

In airport security operations, it is known in the art for suspect luggage/baggage, i.e., alarmed or unknown luggage items, to be inspected in a Checked Bag Reconciliation Area (CBRA). In the CBRA, the suspect luggage items are inspected by an agent and subsequently transferred to an appropriate location based on the inspection. Typically, the suspect luggage enters the CBRA on a staging conveyor from which it is manually removed by an agent and placed on a stand-alone inspection table. The luggage is then inspected on the inspection table by the agent, and based on the inspection, the agent determines whether the luggage item is cleared or not cleared. If the suspect luggage is cleared by the agent, it is manually transported by the agent to a clearance conveyor from which it can be picked up by another agent for transportation to an airplane or other suitable destination. If the suspect luggage is not cleared by the agent, it is transferred to a re-insert conveyor wherein it is transferred to an appropriate destination for further inspection.

There remains room in the art for improved luggage handling and transportation processes, particularly in activity areas like the CBRA. More specifically, there remains a need for improvements to make current luggage inspection processes in the CBRA more streamlined and less physically demanding for agents working in the CBRA.

SUMMARY OF THE INVENTION

According to an aspect of the disclosure, the disclosure provides for a method of operating a checked bag reconciliation area. The method includes the step of transporting a luggage item from an entrance mechanism to one of a plurality of inspection stations. Once the luggage item is at the inspection station, the method proceeds by conducting an inspection of the luggage item at the inspection station. The step of transporting the luggage item from an entrance mechanism to one of a plurality of inspection stations includes transporting the luggage item to the inspection station with the luggage item disposed on a search table of an automatic guided vehicle, and the step of conducting an inspection of the luggage item includes conducting the inspection of the luggage item while the luggage item is disposed on the search table of the automatic guided vehicle.

According to a further aspect of the disclosure, an additional method of operating a checked bag reconciliation area is provided. The method includes the step of positioning a luggage item on a search table of an automatic guided vehicle. The method further includes programming at least one bag ID into a control system, wherein the bag ID includes information related to the luggage item. After the bag ID has been programmed into the control system, the method proceeds by determining an inspection station to transport the luggage item based on the bag ID. After the inspection station has been determined, the method proceeds by transmitting instructions to the automatic guided vehicle from the control system to transport the luggage item to the determined inspection station. The method then continues by transporting the luggage item to the determined inspection station with the luggage item disposed on the search table of the automatic guided vehicle. The method then proceeds by conducting an inspection of the luggage item at the determined inspection station with the luggage item disposed on the search table of the automatic guided vehicle.

According to another aspect of the disclosure, a system for operating a checked bag reconciliation area is provided. The system includes an entrance mechanism wherein luggage items are received into the checked baggage reconciliation area. The system also includes at least one inspection station spaced from the entrance mechanism. At least one pathway extends between the entrance mechanism and the at least one inspection station. The system further includes at least one automatic guided vehicle including a chassis having a plurality of wheels for establishing movement of the automatic guided vehicle and a search table connected to the chassis for transporting the luggage items between the entrance conveyor and the inspection station with the luggage item disposed on the search table and for allowing the luggage item to be inspected while the luggage item is positioned on the search table. The system also includes a control system wirelessly connected to the automatic guided vehicle for controlling the movement of the automatic guided vehicle along the at least one pathway between the entrance conveyor and the at least one inspection station.

According to yet another aspect of the disclosure, a method of operating an activity area is provided. The method includes positioning a luggage item on a material handling device with the luggage item located at a first location in the activity area. The method also includes providing instructions from a control system to the material handling device to move the luggage item from the first location to an inspection station in the activity area. The method proceeds with transporting the luggage item from the first location to the inspection station with the material handling device and with the luggage item disposed on the material handling device. Once at the inspection station, the method includes conducting an inspection of the luggage item at the inspection station with the luggage item disposed on the material handling device. The method continues with determining a secondary destination to transport the luggage item based on the inspection of the luggage item. Once the secondary destination has been determined, the method proceeds by providing instructions from the control system to the material handling device to move the luggage item from the inspection station to the determined secondary destination. Finally, the method includes transporting the luggage item to the determined secondary destination with the material handling device with the luggage item disposed on the material handling device.

According to a further aspect of the disclosure, a further system for operating a checked bag reconciliation area is provided. The system includes an entrance mechanism wherein luggage items are received into the checked baggage reconciliation area. The at least one inspection station is spaced from the entrance mechanism. The system also includes at least one material handling device including an inspection surface for supporting at least one of the luggage items on the inspection surface and transporting the at least one luggage item between the entrance mechanism and the inspection station with the at least one luggage item supported by the inspection surface and for allowing the at least one luggage item to be inspected while the at least one luggage items is supported by the inspection surface. The system further includes a control system wirelessly connected to the material handling device for automatically controlling the movement of the material handling device.

According to an additional aspect of the disclosure, a further method of operating a checked bag reconciliation area is provided. The method includes positioning a luggage item on a material handling device while the material handling device is positioned at a first location in the checked bag reconciliation area. The method also includes transmitting a first input to a control system, wherein the first input is related to at least one of: bag ID information related to the luggage item and a condition in the checked bag reconciliation area. The method proceeds by determining one inspection station of a plurality of inspection stations to transport the luggage item to based on the first input. The method further continues with providing instructions from the control system to the material handling device to move from the first location to the determined inspection station. Additionally, the method includes transporting the luggage item from the first location to the determined inspection station with the luggage item disposed on the material handling device.

According to yet another aspect of the disclosure, another method of operating a checked bag reconciliation area is provided. The method includes positioning a plurality of luggage items each on one of a plurality of material handling devices. The method further includes transmitting a first input to a control system, wherein the first input is related to at least one of: bag ID information related to the luggage items and a condition in the checked bag reconciliation area. The method proceeds by determining an order of priority of the material handling devices based on the first input. The method continues with providing instructions from the control system to the plurality of material handling devices to each move to one of a plurality of inspection stations in the determined order of priority. Finally, the method includes transporting the luggage items from the first location to the plurality of inspection stations in the determined order of priority with the luggage items each disposed on one of the material handling devices.

According to another aspect of the disclosure, a further system for operating a checked bag reconciliation area is provided. The system includes an entrance mechanism wherein luggage items are received into the checked bag reconciliation area. At least one inspection station is spaced from the entrance mechanism by a transportation distance. The system further includes at least one material handling device including an inspection surface for supporting at least one of the luggage items on the inspection surface and transporting the at least one luggage item between the entrance mechanism and the inspection station along the transportation distance with the at least one luggage item supported by the inspection surface and for allowing the at least one luggage item to be inspected while the at least one luggage items is supported by the inspection surface. The transportation distance between the entrance mechanism and the at least one inspection station is independent of the conveyors. Furthermore, a control system is wirelessly connected to the material handling device for automatically controlling the movement of the material handling device.

According to yet another aspect of the subject disclosure, a system for prioritizing an automated movement of a plurality of luggage items is provided. The system includes a data store comprising a computer readable medium storing a program of instructions for the prioritizing the automated movement. The system also includes a processor that executes the program of instructions. Furthermore, the system includes a luggage information receiver configured to receive data associated with each of the plurality of luggage items. Moreover, the system includes a luggage classifier configured to correspond the received data with priority data, the priority data being assigned to each of the plurality of luggage items. Additionally, the system includes an instructions communicator configured to communicate the priority data to a system for operating a checked bag reconciliation area. The plurality of luggage items are processed via the checked bag reconciliation area based on the priority data.

According to a further aspect of the disclosure, a further method of operating a checked bag reconciliation area is provided. The method includes transporting a luggage item from an entrance mechanism to one of a plurality of inspection stations. After the luggage item is transported to the inspection station, the method continues by conducting an inspection of the luggage item at the inspection station. Transporting a luggage item from an entrance mechanism to one of a plurality of inspection stations includes transporting the luggage item to the inspection station with the luggage item disposed on a search table of an automatic guided vehicle. Further, conducting an inspection of the luggage item includes conducting the inspection of the luggage item while the luggage item is disposed on the search table of the automatic guided vehicle, and wherein the inspection is conducted independent of an agent.

Advantages of the Invention

The invention it is broadest aspect therefore provides for a system and method for operating a checked bag reconciliation area that improves manpower utilization, minimizes strenuous handling of luggage items, and improves data handling throughout the luggage inspection process.

More particularly, since the luggage items are automatically delivered to the inspection stations, and the luggage items may automatically depart the inspection by way of the material handling devices, the prior art steps of manually placing the bag onto the search table and manually moving the bag to the correct disposition location are eliminated. By eliminating these steps, luggage items are able to be processed through the activity area faster, and agents are able to invest more time and energy into the primary task of investigating luggage items or into other value added processing operations. Additionally, since these steps are eliminated, the likelihood of workplace injuries is reduced since the number of strenuous lifting tasks is reduced. Eliminating these steps also expands the job pool of people that may work as agents, including those with certain physical disabilities.

According to a further aspect of the subject method and system, luggage items may be prioritized and processed faster because the material handling devices may be dynamically assigned to inspection stations and automatically moved to the inspection stations based on conditions in the activity area and bag ID information that correlates with the luggage items, like departure time and security level.

Furthermore, the subject method and system improves the handling of data related to the luggage items because bag ID information associated with the luggage items is synced with the material handling devices and the luggage items travel with the same material handling device throughout the inspection process.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 10 is a flow diagram of a fifth example method of operating an activity area;

FIG. 11 is a flow diagram of a sixth example method of operating an activity area.

DESCRIPTION OF THE ENABLING EMBODIMENT

Referring to the Figures, wherein like numerals indicate corresponding parts throughout the several views, a system and method of operating an activity area, such as a checked bag reconciliation area 20 is disclosed. The example embodiments demonstrate how the subject system and method may be utilized in a checked bag reconciliation area 20 of an airport, however, it should be appreciated that the subject system and method can be utilized in activity areas of other transportation hubs including, but not limited to, checked bag reconciliation areas of train stations and marinas.

Figure 1:
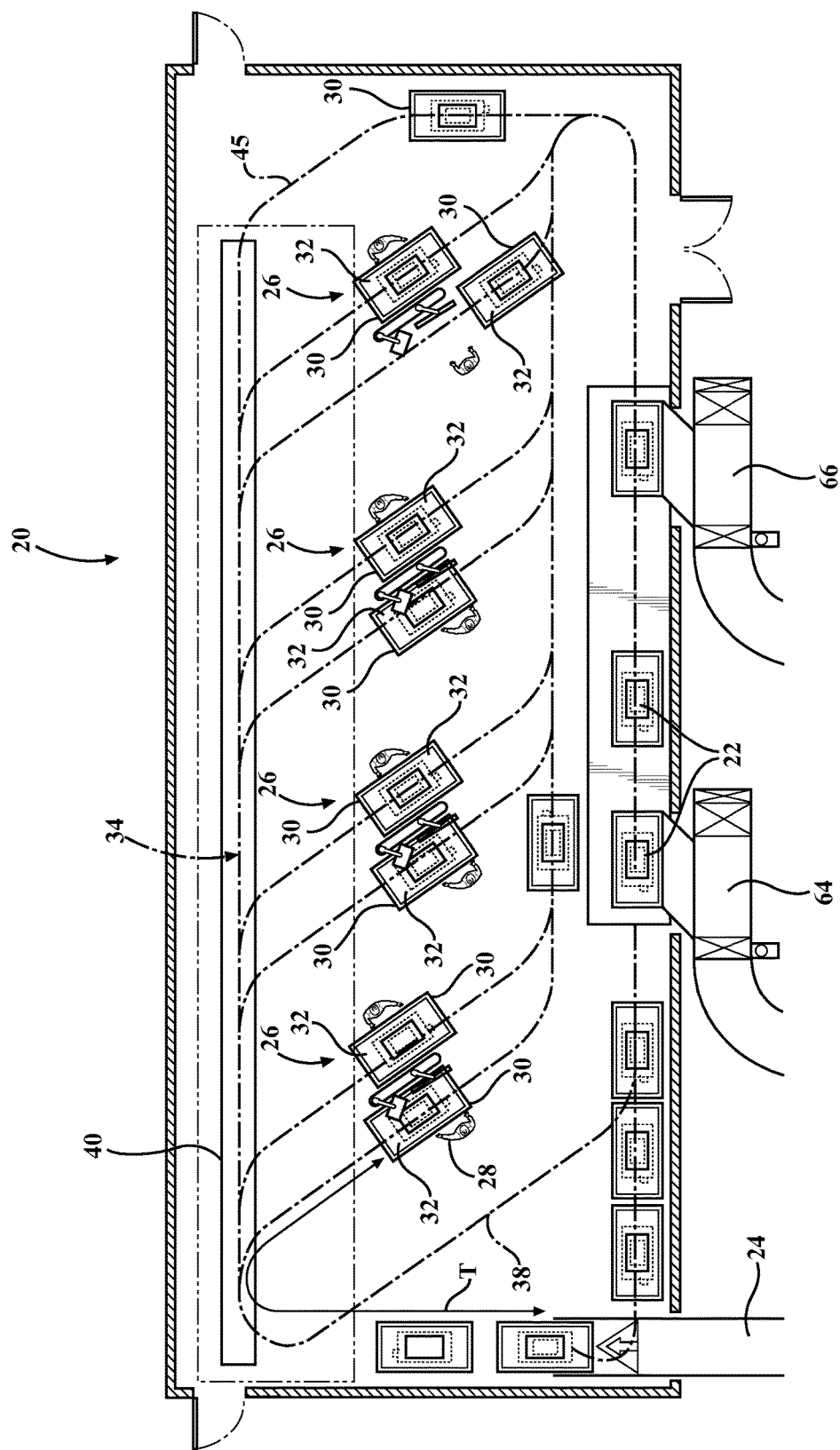
FIG. 1 is a top schematic view of an example embodiment of a checked bag reconciliation area including a plurality of automatic guided vehicles disposed therein.

An example embodiment of an improved checked bag reconciliation area 20 in accordance with the subject system is shown in FIG. 1. The system includes an entrance mechanism 24 for providing suspect luggage items 22 into the checked baggage reconciliation area. In the example embodiment, the entrance mechanism is an alarm conveyor line 24 that extends into the checked bag reconciliation area 20 for delivering suspect luggage items into the checked bag reconciliation area 20. It should be appreciated that other types of entrance mechanisms 24 could be used such as, but not limited to, an ingress door.

Furthermore, a plurality of inspection stations 26 are spaced from the alarm conveyor line 24 by a transportation distance T. Four inspection stations 26 are provided in the checked bag reconciliation area 20 of the example embodiment, however, it should be appreciated that more or fewer inspection stations 26 could be utilized depending on the specific needs of the particular checked bag reconciliation area 20. Each of the inspection stations 26 may be stationed by one or more inspecting agents 28. The inspecting agents 28 conduct inspections of the luggage items 22 that are received by the alarm conveyor line 24 after they are delivered to the inspection stations 26. The inspection stations 26 could alternatively be completely autonomously, i.e., operated by machines/computers and independent of an human agent.

The system further includes at least one material handling device 30 for receiving luggage items 22 from the alarm conveyor line 24 and transporting the luggage items 22 within the checked bag reconciliation area 20. In the example embodiments, the material handling device 30 is an automatic guided vehicle 30, however, it is anticipated that other automatic material handling devices could be utilized including, but not limited to, overhead conveyors. In the example embodiments, the luggage items 22 are received onto a search table 32 of the automatic guided vehicle 30 from the alarm conveyor line 24. It should be appreciated that any number of automatic guided vehicles 30 could be utilized and it is advantageously easy to add and remove automatic guided vehicles 30 from the checked bag reconciliation area 20. As will be discussed in greater detail below, each automatic guided vehicle 30 is programmed to automatically, i.e., without a human driver, transport the luggage items 22 through the checked bag reconciliation area 20 based on instructions provided by a control system 44. In the example embodiment, a single luggage item 22 may be disposed on the search table 32 of each automatic guided vehicle 30, however, it should be appreciated that more luggage items 22 could be disposed thereon.

In the example embodiments, the transportation distance T between the entrance mechanism 24 and the inspection stations 26 is completely independent of conveyors. More specifically, rather than using conveyors to transport luggage items 22 along the transportation distance T, the luggage items 22 are entirely transported by way of the automatic guided vehicles 30. The term "conveyor" as used herein includes all conventional material moving conveyors. It should be appreciated that making the transportation distance T independent of conveyors advantageously opens up the floor space along the transportation distance T. Thus, other objects may be placed on the floor space, and, as presented in FIG. 5, the open floor space may be used to provide additional ingress/egress paths 67 for agents, or additional routes that the automatic guided vehicles 30 may follow. This also advantageously allows the checked bag reconciliation area 20 to be smaller.

With reference back to FIG. 1, a pathway 34 is disposed on the ground of the checked bag reconciliation area 20 on which the automatic guided vehicles 30 are configured to follow. The pathway 34 includes numerous segments that extend to different areas of the checked bag reconciliation area 20 to allow the automatic guided vehicle 30 to be moved to the different areas based on the instructions from the control system 44. The pathway 34 may take various forms including, but not limited to, magnetic markers or wires on the floor. Further, the pathway 34 may be electronically mapped into software of the control system 44 such that the automatic guided vehicle 30 may be programmed to automatically move along a programmed pathway 34 via GPS coordinate mapping.

Figure 4:
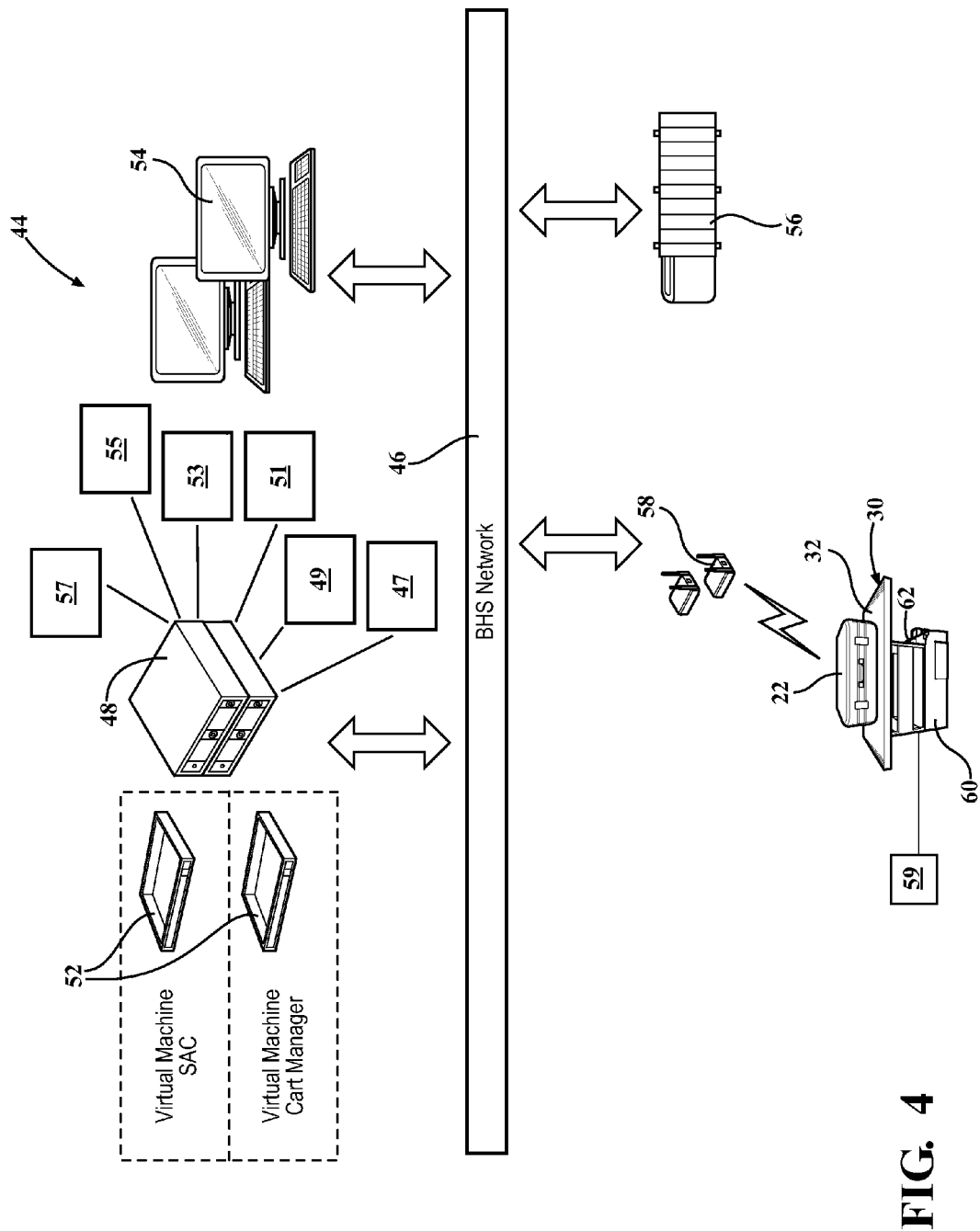
FIG. 4 is a schematic view of an example embodiment of a control system for controlling the automatic guided vehicles in the checked bag reconciliation area.

FIG. 4 is a diagram of components of the control system 44 that controls the various components of the checked bag reconciliation area 20. The control system 44 includes a Baggage Handling System (BHS) Network 46 for connecting to the various components of the checked bag reconciliation area 20. The control system 44 further includes one or more primary and backup servers 48 for hosting the BHS network 46 and storing network information on one or more databases of the servers 48. More specifically, a data record containing inputs such as bag ID information on each luggage item and information related conditions within the checked bag reconciliation area 20 are stored on databases of the servers 50. The bag ID information may include information such as flight departure time, flight destination, Risk Based Security (RBS) level, and a priority indicator that correlates with each specific luggage items 22. Furthermore, the condition in the checked bag reconciliation area 20 may include various conditions including, but not limited to, the speeds at which luggage items 22 are being processed through each inspection station 26

More specific aspects of the servers 48 include a data store 47 that includes a computer readable medium 49 that has a program of instructions for prioritizing automatic movement of the material handling devices 30. The servers 48 may also include a processor 51 for executing the program of instructions. The server 48 may further include a luggage information receiver 53 that is configured to receive the bag ID information/conditions of the checked bag reconciliation area 20. Moreover, the servers 48 are programmed to include a luggage classifier 55 that is configured to correlate the received bag ID information with priority data, wherein the priority data is assigned to each of the plurality of luggage items 22. The server also includes an instructions communicator 57 that is configured to communicate the priority data to the BHS Network 46 to move the automatic guided vehicles 30 and process the luggage items 22 based on the priority data. The servers 50 may further include one or more virtual machines 52 that provide for remote access to the server 50.

The control system 44 also includes one or more graphical user interfaces 54 that are connected to the BHS Network 46 for presenting network information to agents 28 of the network 46. One of the graphical user interfaces 54 is disposed on each of the automatic guided vehicles 30. The graphical user interfaces 54 may further be disposed at other locations with the checked bag reconciliation area 20, e.g., at the inspection stations 26. Furthermore, a plurality of programmable logic controllers 56 are connected to the network 46 for activating and deactivating components of the checked bag reconciliation area 20, e.g., conveyors. The control system 44 also includes one or more wireless access points 58 that are connected to the network 46 for providing wireless access to components of the checked bag reconciliation area 20, including the automatic guided vehicles 30.

A cart computer 59 (schematically shown), is disposed on each of the automatic guided vehicles 30 and is electrically connected to the BHS Network 46 via the wireless access point 58 for transmitting and receiving information over the BHS Network 46 for controlling the movement of the automatic guided vehicles 30 along different sections of the pathway 34. Said another way, during operation of the checked bag reconciliation area 20, the cart computers 59 of the automatic guided vehicles 30 receive instructions from the control system 44 to move the automatic guided vehicles along specific sections of the pathway 34 based on the bag ID information that is associated with each specific luggage item 22.

The cart computer 59 of each automatic guided vehicle 30 is electrically connected with the graphical user interface 54 on each of the automatic guided vehicles 30 for allowing agents 28 to view the bag ID information associated with each luggage item 22, to transmit information to the control system 44, and to program movement of the automatic guided vehicles 30 based on the inspections that they perform. The graphical user interface 54 on each of the automatic guided vehicles 30 may be configured as a touch screen to allow the agent 28 to input information into the cart computer 59. Alternatively, one or more stand-alone input devices, e.g., a keyboard and mouse, may be utilized to allow the agent to input information into the cart computer 59.

With reference back to FIG. 1, a staging area 40 is provided for positioning the automatic guided vehicles 30 after receiving luggage items and prior to moving to the at least one inspection station 26. From the staging area 40, the automatic guided vehicle 30 may dynamically follow specific sections of the pathway 34 to the inspection stations 26 based on instructions from the control system 44.

After a luggage item 22 has been inspected at the inspection stations 26, it may be transferred via the material handling device 30 to one of a plurality of secondary destination 64, 66. The secondary destinations 64, 66 include a clear bag conveyor line 64 to which the luggage item 22 is transported in response to a determination that the luggage item 22 has a clear status. The secondary destination 64, 66 may further include a re-inspection conveyor line 66 to which the luggage item 22 may be transported in response to a determination that the luggage item 22 must be re-inspected. The secondary destination 64, 66 may further include a fail area, or secondary search station (not shown) that the luggage item may be transported to in the event of a failed search.

Figure 2:
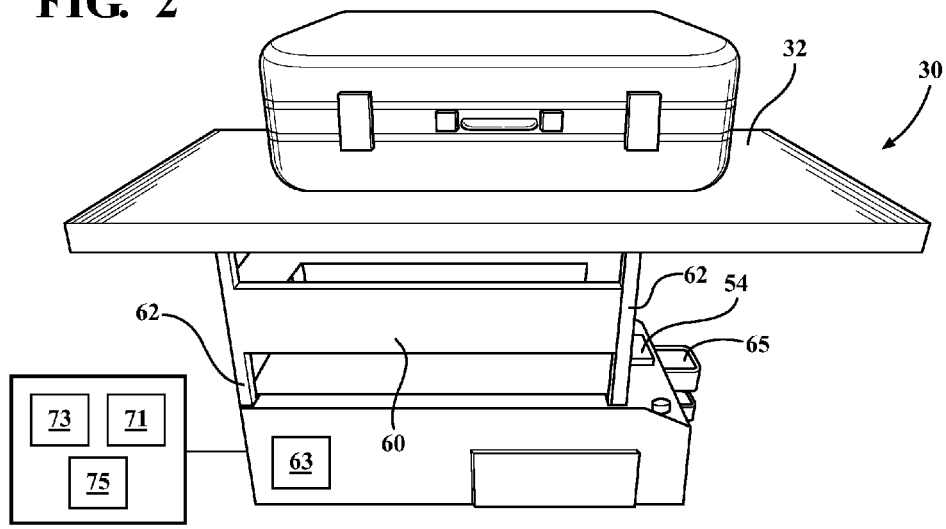
FIG. 2 is a perspective view of an example embodiment of an automatic guided vehicle with a luggage item disposed on a search table of the automatic guided vehicle.
Figure 3:
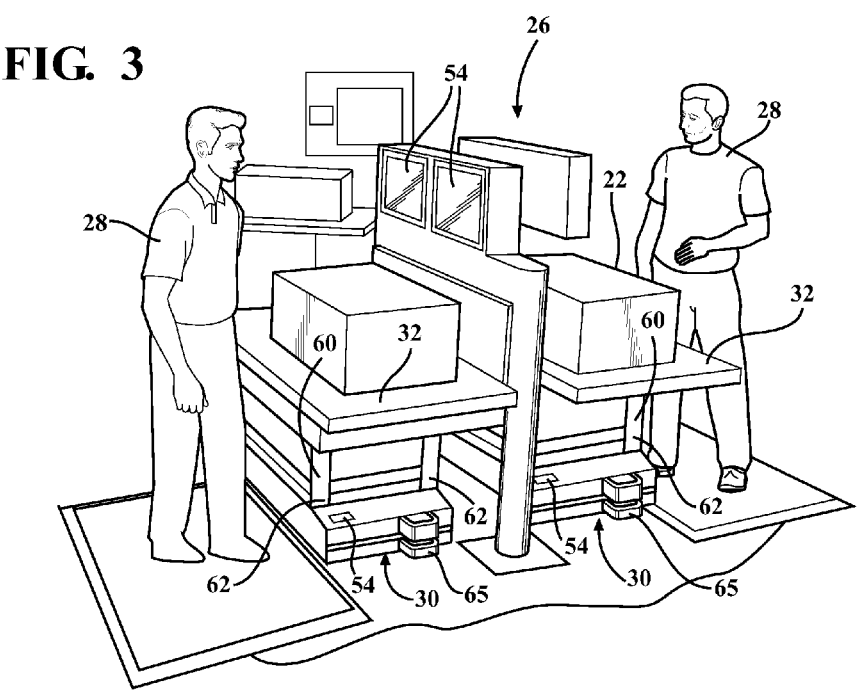
FIG. 3 is a perspective view of a pair of inspection stations, each with an automatic guided vehicle and inspecting agent positioned at the inspecting station.

An example embodiment of an automatic guided vehicle 30 is best presented in FIG. 2. The automatic guided vehicle 30 includes a chassis 60. A plurality of wheels (not shown) are connected to the chassis 60 for establishing rolling movement of the automatic guided vehicle 30. The automatic guided vehicle 30 further includes a powertrain 71, 73, 75 (schematically shown) that is operably connected to the wheels for providing movement of the wheels. In the example embodiment, the powertrain includes a battery 71, an electric motor 73, and transaxle 75 that are operably connected to the wheels to provide movement to the wheels. It should be appreciated that other types of powertrain components could be utilized, e.g., an internal combustion engine.

The automatic guided vehicle 30 further includes a search table 32 that is connected to the chassis 60. The search table 32 is large enough such that it can receive a luggage item 22 and transport the luggage item 22 while the luggage item 22 is positioned on the search table 32. Furthermore, the search table 32 is large enough such that the luggage item 22 may be inspected while disposed on the search table 32. In the example embodiment, the search table 32 is of of a stainless steel material and extends along a plane with a generally rectangular shape. It should be appreciated that the stainless steel material allows the search table 32 to be easily wiped clean. It should be further be appreciated, that the search table 32 could have other shapes, and does not have to extend along a plane. Further, it should be appreciated that the search table 32 could be made of other suitable materials, ideally of materials that are easy to maintain in a sterile condition.

The automatic guided vehicle 30 also includes a lifting mechanism 62 that interconnects the chassis 60 and the search table 32. The lifting mechanism 62 is configured to adjust the height of the search table 32 and to pivot the search table 32 relative to the chassis 60 to allow the search table 32 to be raised, lowered, and pivoted relative to the chassis 60. In the example embodiment, the lifting mechanism 62 includes a plurality of telescoping legs 62 that are connected to an actuator (not shown) to provide movement of the telescoping legs 62. The telescoping legs 62 may be independently moveable relative to one another to provide for pivoting movement of the search table 32. It should be appreciated that other lifting mechanisms 62 could be utilized such as, but not limited to, a scissor-lift type mechanism. It should also be appreciated that the lifting mechanism 62 may be configured to pivot the search table 32 in any direction. Various components may alternatively be utilized to provide the pivoting movement of the search table 32, e.g., one or more ball joints, or a plurality of support members that pivot relative to one another and/or the chassis 60 and search table 32.

The automatic guided vehicle 30 may further include a connecting mechanism (not shown) for connecting the automatic guided vehicle 30 to other automatic guided vehicles 30. The connecting mechanism may also be utilized to connect the automatic guide vehicle 30 to a conveyor to allow luggage items 22 to easily be received onto the search table 32 from a conveyor, and to allow the automatic guided vehicle 30 to easily dispense items from the search table 32 onto the conveyor. Said another way, the connecting mechanism may be used to fixedly connect the automatic guided vehicle 30 to a conveyor with the automatic guided vehicle 30 disposed in alignment with the conveyor, thereby allowing luggage items 22 to easily be transferred between the conveyor and the automatic guided vehicle 30.

The automatic guided vehicle 30 also includes a proximity sensor 63 (schematically shown) for detecting the presence of objects in the way of the automatic guided vehicle. The proximity sensor 63 is electrically connected to the cart computer 59 to stop the automatic guided vehicle 30 in response to detection of objects by the proximity sensor 63. The automatic guided vehicle 30 also includes a detecting mechanism 65 for detecting the position of the pathway 34 relative to the automatic guided vehicle 30 to facilitate movement of the automatic guided vehicle 30 along the pathway 34. The automatic guided vehicle 30 further may include such features as an emergency stop button to allow an agent to stop the automatic guided vehicle in the event of an emergency and a charging input to allow the automatic guided vehicle 30 to easily be connected to a charging terminal at an inspection station 26 while luggage items 22 disposed on the search table 32 are being inspected (or at other locations within the activity area).

With reference to FIGS. 6-12, methods of operating a checked bag reconciliation area 20 are also disclosed. According to a first example method best presented in FIG. 6, the method includes 100 receiving a luggage item 22 onto a material handling device 30 from an entrance mechanism 24 of the checked bag reconciliation area 20. As explained above, the material handling device 30 may be an automatic guided vehicle 30, and the luggage item 22 may be received into a search table 32 of the automatic guided vehicle 30. As explained in the foregoing, in the example embodiment of the checked bag reconciliation area 20, the entrance mechanism is an alarm conveyor line 24. In more detail, the step of 100 receiving the luggage item 22 onto the search table 32 in the example embodiment includes moving the automatic guided vehicle 30 from a position beneath the alarm conveyor to a position in which the automatic guided vehicle 30 is adjacent to an end of the alarm conveyor line 24 and vertically lower than the alarm conveyor line 24. Once the automatic guide vehicle 30 is in this position, the alarm conveyor line 24 can push a luggage item 22 onto the search table 32. Said another way, the automatic guided vehicle 30 may move a distance along and beneath a length of the alarm conveyor line 24 and stop at a position in which the search table 32 extends at least partially past the end of the alarm conveyor line 24 to allow luggage items 22 to be dumped onto the search table 32 after the luggage items 22 are pushed past the end of the alarm conveyor line 24.

After the luggage item 22 is disposed on the search table 32 of the automatic guided vehicle 30, the method continues with 102 transporting the luggage item 22 on the material handling device 30 to the staging area 40 with the luggage item 22 disposed on the material handling device 30. More particularly, the luggage item 22 may be disposed on a search table 32 of the automatic guided vehicle 30 during transportation to the staging area 40. It should be appreciated that a plurality of automatic guided vehicles 30 may line up in the staging area 40, at which they remain until further instructions are provided by the control system 44. In the event that a luggage item 22 was already disposed on the search table 32 of the automatic guided vehicle 30 when the automatic guided vehicle 30 entered the checked bag reconciliation area 20, the pathway 34 includes a loading bypass path segment 38 that the automatic guided vehicle 30 may follow to bypass the alarm conveyor line 24. In other words, the automatic guided vehicle 30 may follow the loading bypass path 38 to bypass the alarm conveyor line 24 and be moved directly to the staging area 40 if it is not necessary to receive a luggage item 22 from the alarm conveyor line 24.

The method also includes 104 programming at least one input, such as bag ID information or a condition in the checked bag reconciliation area 20, into the control system 44. The input may be programmed into the control system 44 in various ways. For example, the input may be manually entered via a computer. As mentioned in the foregoing, the bag ID may include information related to the at least one luggage item 22 such as, but not limited to, flight departure time, flight destination and a risk based security level. Furthermore, the condition in the checked bag reconciliation area 20 may include various conditions including, but not limited to, the speeds at which luggage items 22 are being processed at each inspection station 26. It should be appreciated that the input may be programmed into the control system 44 before or after the automatic guided vehicle 30 is positioned at the staging area 40.

After the input has been programmed into the control system 44, the method continues with 106 determining an inspection station 26 to transport the luggage item 22 to based on the first input. During this step, the control system 44 dynamically assigns the material handling devices 30 to specific inspection stations 26 based on the input, such as the bag ID information of the luggage items disposed on the specific material handling devices 30. For example, the automatic guided vehicle 30 may recognize, based on the bag ID information, that a particular luggage item 22 has a high risk level associated therewith, and therefore dynamically assign the luggage item 22 to a high-risk inspection station 26.

The method further also includes 108 determining an order of priority of the material handling devices 30 based on the input. Based on the determined order of priority, the luggage items 22 may advantageously be directed to inspection stations 26 in various orders based on need, and don't have to follow a "first in, first out" approach as is used in conventional checked bag reconciliation areas. For example the control system 44 may recognize, based on the bag ID information, that a particular luggage item 22 is scheduled to be stowed on an airplane that has a shortly approaching departure. To ensure that the luggage item 22 is delivered to the airplane on time, the automatic guided vehicle 30 dynamically assigns the luggage item 22 to an inspection station 26 that is currently available. During such a scenario, the automatic guided vehicle 30 may take priority to the chosen inspection station 26 over other automatic guided vehicles 30 that are waiting in queue.

It should be appreciated that the data store 47, computer readable medium 49, processor 51, luggage information reader 53, luggage classifier 55 and instructions communicator 57 of the servers 48 may be utilized to determine an inspection station 26 and to determine an order or priority. It should further be appreciated that the steps of 106 determining an inspection station and 108 determining an order of priority may be performed separately, or at the same time as one another.

The bag ID information of a specific luggage item 22 may be synced with the cart computer 59 of the specific automatic guided vehicle 30 on which the luggage item 22 is placed after the bag ID information has been entered into control system 44. Thus, after the bag ID information for a specific luggage item 22 has been synced with a specific cart computer 59, the bag ID information may be displayed on the graphical user interface 54 of the automatic guided vehicle 30 or the inspection station 26 at which the automatic guided vehicle 30 is positioned to assist agents during inspections.

After the inspection station 26 has been determined, the method continues by 110 transmitting instructions to the material handling device 30 from the control system 44 to transport the luggage item 22 to the determined inspection station 26. The method then continues with 112 transporting the luggage item 22 on the material handling devices 30 to the determined inspection station 26. More specifically, the luggage item 22 may be transported to the determined inspection station 26 while disposed on the search table 32 of the automatic guided vehicle 30. In the event that it is determined that the luggage item 22 does not need to be transported to an inspection station 26, the pathway 34 includes a bypass search segment 45 that the material handling device 30 may follow to bypass the inspection stations 26.

In an embodiment, once the material handling device 30 is positioned at the determined inspection station 26, the method continues with 114 moving the search table 32 relative to the chassis 60 in a direction transverse to search table 32 to optimize the height of the search table 32 for the agent 28 positioned at the inspection station 26. Said another way, the height of the search table 32 is adjusted to provide an ideal ergonomic placement of the search table 32 at which the agent 28 may inspect the luggage item 22. It should be appreciated that being able to adjust the height of the search table 32 makes the inspection process more ergonomic for agents 28 and even expands the pool of people which may work as agents 28, including those with physical disabilities, e.g., those who utilize a wheelchair. Alternatively, the height of the search table 32 may be optimized for an automatic inspection machine that is positioned at the inspection station 26.

After the height of the search table 32 has been adjusted, the method continues with 116 presenting the bag ID information to the inspection station 26. More specifically, the bag ID information may be presented to an agent 28 positioned at the inspection station 26. As mentioned in the foregoing, the bag ID information may be presented to the agent 28 on the graphical user interface 54 on the automatic guided vehicle 30 or on an auxiliary graphical user interface 54 that is positioned at the inspection station 26. Additionally, the bag ID information may be scanned by a reading device (or otherwise programmed into the inspection station 26). This may be utilized in embodiments in which the inspection station 26 is autonomous.

The method then includes 118 conducting an inspection of the luggage item 22 to determine a second destination 64, 66 to which the luggage item 22 should be transported. It should be appreciated that the inspection may be performed by an agent 28, or it may be performed entirely autonomously, i.e., independent of an agent. It should also be appreciated that the agent 28 may utilize the bag ID information during the inspection. Once the second destination 64, 66 has been determined, the method proceeds by 120 determining and programming the secondary destination into the control system 44, and 122 transmitting instructions to the material handling device 30 from the control system 44 to transport the luggage item 22 to the secondary destination 64, 66. The method continues by 124 transporting the luggage item 22 to the secondary destination 64, 66 with the luggage item 22 disposed on the material handling device 30. More specifically, the luggage item 22 may be transported to the secondary destination 64, 66 while disposed on the search table 32 of the automatic guided vehicle 30.

As mentioned in the foregoing, the secondary destinations 64, 66 may include a clear bag conveyor line 64 to which the luggage item 22 is transported in response to a determination that the luggage item 22 has a clear status. Once at the clear bag conveyor line 64, the method continues with 126 unloading the luggage item 22 at the secondary destination. More specifically, the search table 32 may be moved relative to the chassis 60 in a direction transverse to the search table 32. The search table 32 may also be pivoted relative to the chassis 60 to unload the luggage onto the clear bag conveyor line 64. Once on the clear bag conveyor line 64, the luggage item 22 is transported to a suitable destination to further the process of moving the luggage item 22 to its ultimate destination.

As also mentioned in the foregoing, the secondary destination 64, 66 may also include a re-inspection conveyor line 66 to which the luggage item 22 is transported in response to a determination that the luggage item 22 must be re-inspected. Like at the clear bag conveyor line 64, once the material handling device 30 is positioned at the re-inspection conveyor line 66, the search table 32 may be moved relative to the chassis 60 in a direction transverse to the chassis 60 and pivoted relative to the chassis 60 to unload the luggage onto the re-inspection conveyor line 66. Once on the re-inspection conveyor line 66, the luggage item 22 is transported to a suitable destination for further inspection. For example, the luggage item 22 may be transported to a secondary inspection station 26 for a more detailed inspection.

The secondary destination may further include a failed area or secondary search station (not shown) to which the luggage item 22 may be directed in the event of a failed inspection wherein it may receive a more detailed inspection.

It should be appreciated that numerous advantages are provided by the system and method disclosed herein. With regard to benefits related to the work force that operates the checked bag reconciliation area 20, a first advantage is that agents 28 are able to remain better focused on the task of inspecting luggage since the material handling device 30 automatically delivers the suspect luggage to the inspection station 26. Therefore, the agent 28 is able to focus his/her attention on the task of inspecting luggage items 22 rather than other tasks like manually transporting the luggage items 22. Furthermore, because the automatic guided vehicle 30 automatically delivers the luggage item 22 to the inspection station 26, agents 28 are not exposed to strains associated with the strains of lifting luggage items 22. This can lead to reduced lost time and improved morale. Additionally, because the height of the search table 32 is adjustable, the ergonomics of the inspection process are improved for agents 28, and a larger group of people may perform inspection tasks.

Figure 5:
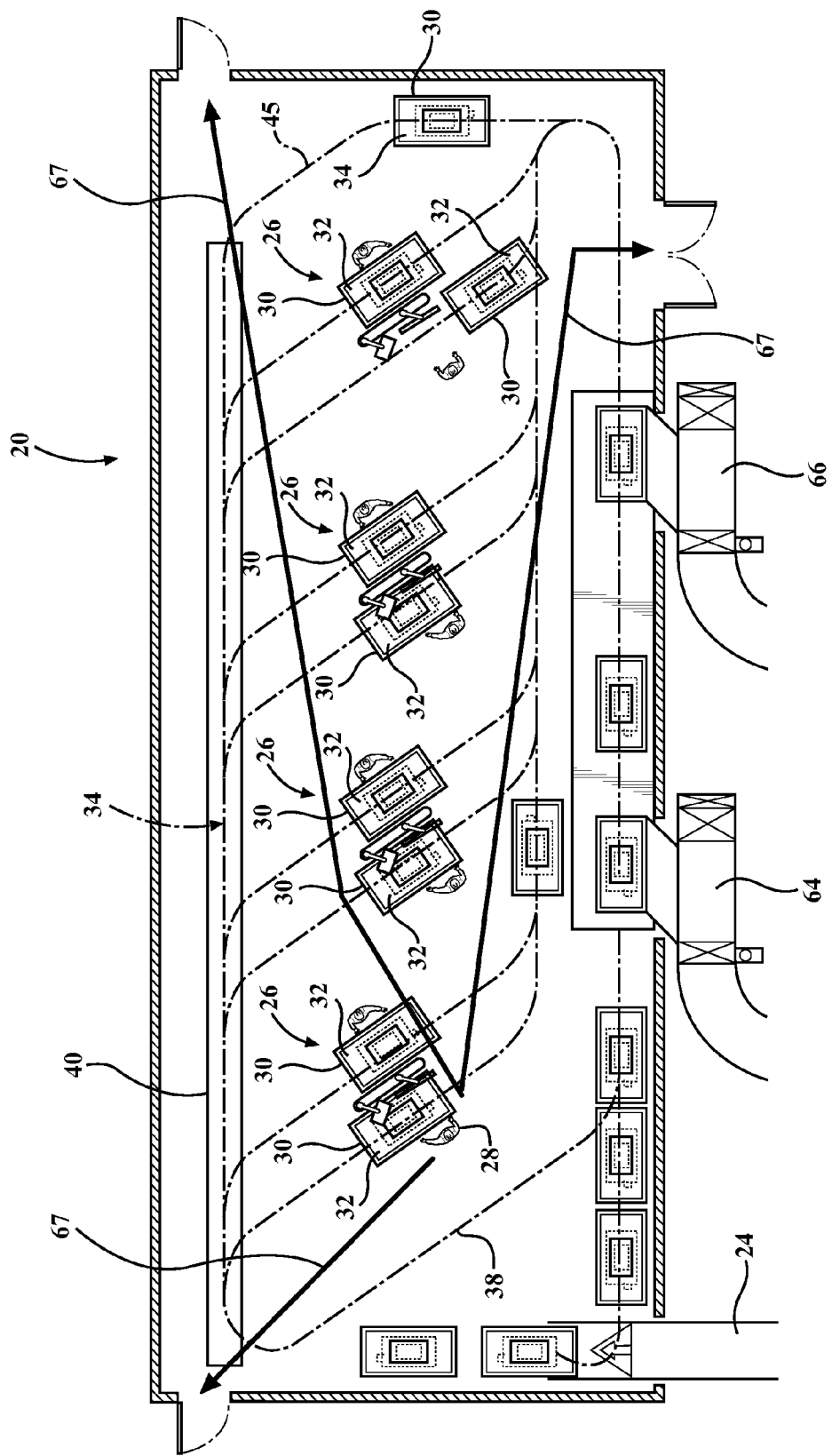
FIG. 5 is a top schematic view of the checked bag reconciliation area of FIG. 1 illustrating egress paths which inspecting agents may utilize.
Figure 6:
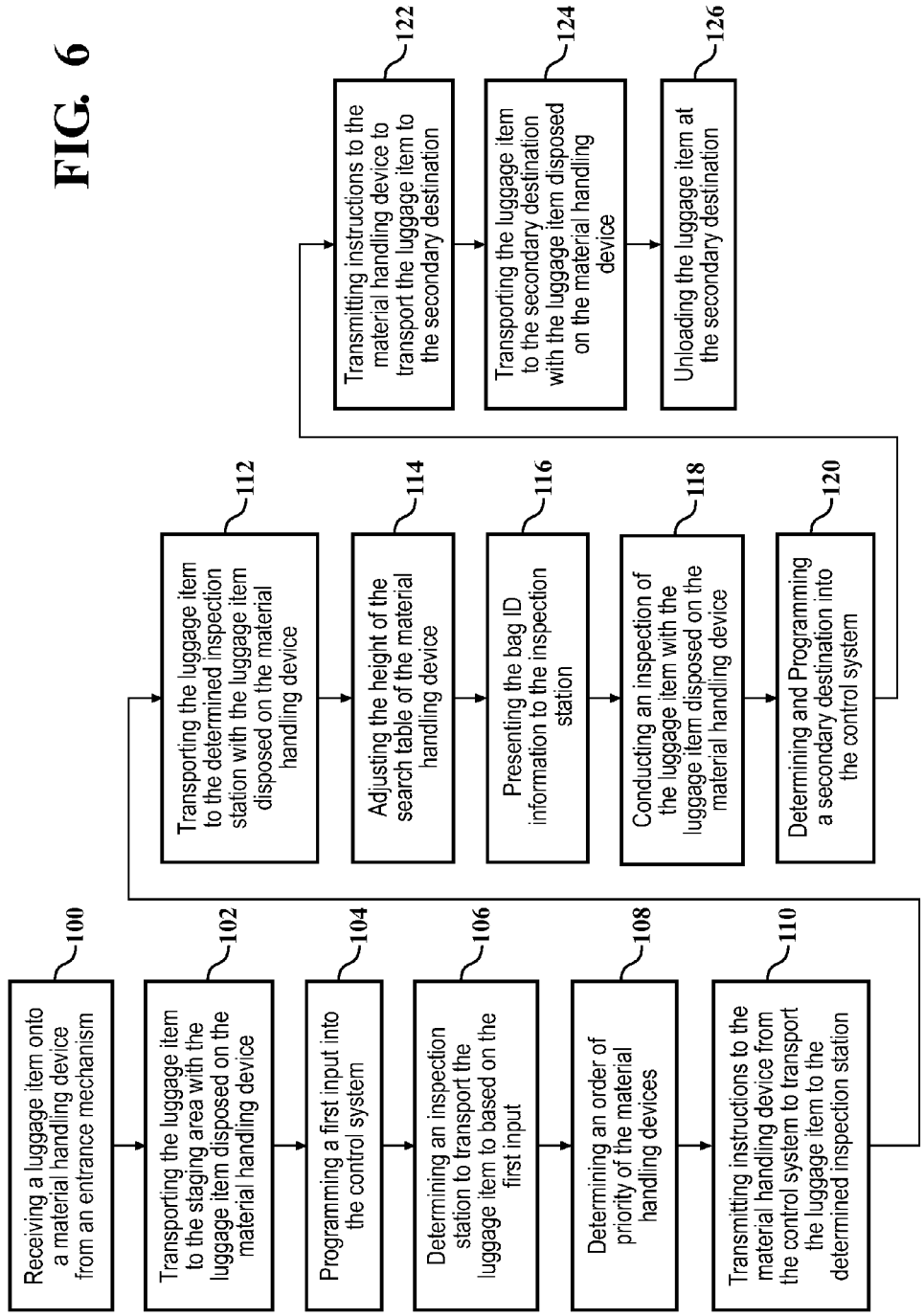
FIG. 6 is a flow diagram of a first example method of operating an activity area.
Figure 7:
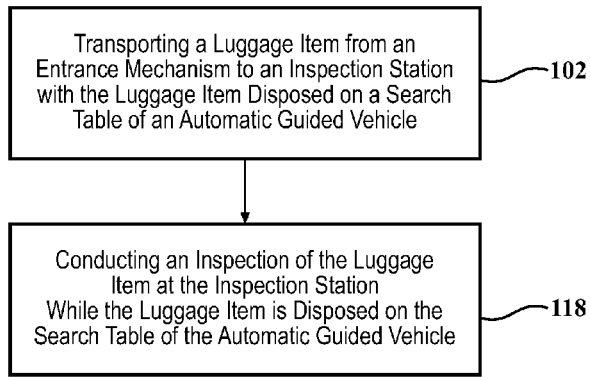
FIG. 7 is a flow diagram of a second example method of operating an activity area.
Figure 8:
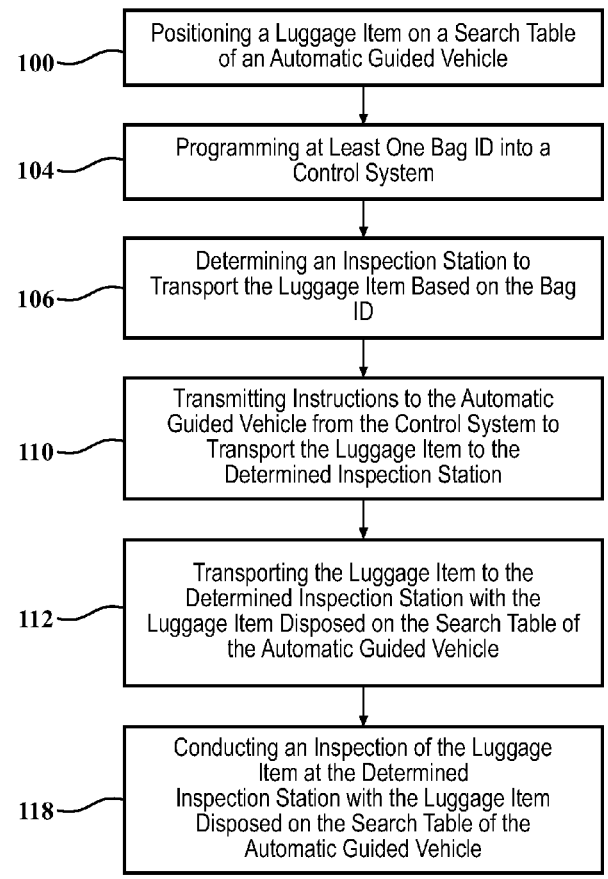
FIG. 8 is a flow diagram of a third example method of operating an activity area.
Figure 9:
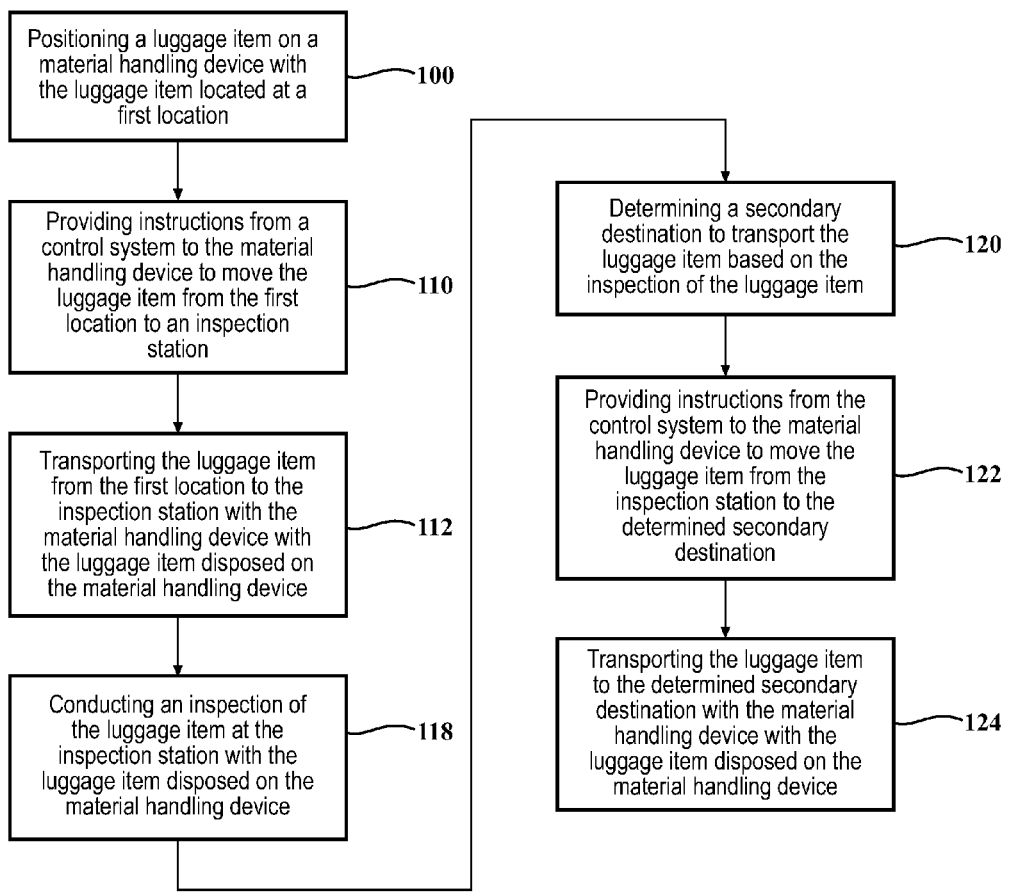
FIG. 9 is a flow diagram of a fourth example method of operating an activity area.
Figure 12:
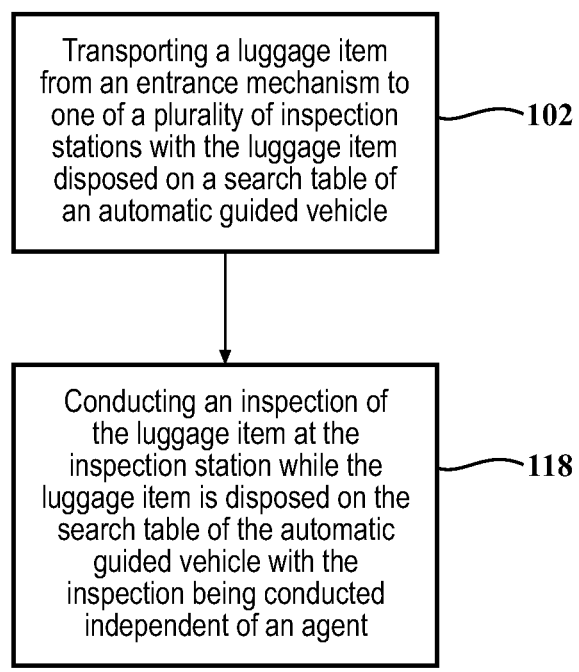
FIG. 12 is a flow diagram of a seventh example method of operating an activity area.

Furthermore, as illustrated in FIG. 5, since fewer conveyors and other pieces of equipment are required in the checked bag reconciliation area 20 of the subject system, more ingress/egress paths 67 are provided that an agent 28 may follow. This provides for a more efficient and safe work environment.

The checked bag reconciliation area 20 also advantageously requires less space than convention checked bag reconciliation areas since the automatic guided vehicles 30 take up less space than conventional conveyor systems.

Additionally, the checked bag reconciliation area 20 may be quieter since fewer loud components, like conveyors, have to be utilized. In addition, automatic guided vehicles 30 may easily be shared between different checked bag reconciliation areas 20 if needed, thus improving throughput in the overall baggage handling operation.

Furthermore, the configuration of the checked bag reconciliation area 20 is easily modified based on current demands since few components are present that may have to be moved.

Additionally, different portions of the checked bag reconciliation area 20 are easily accessible because fewer barriers exist to navigate around the checked bag reconciliation area 20, especially as compared to prior art checked bag reconciliation areas which include numerous conveyors.

In addition, the checked bag reconciliation area 20 may be a very hygienic work atmosphere since fewer components are utilized and because the automatic guided vehicles 30 are easily cleaned.

The preceding describes an implementation of the above method, but practitioners skilled in material handling can easily see other implementations using different equipment configurations. Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A method of operating a checked bag reconciliation area, said method including:
    loading a plurality of luggage items from an entrance mechanism each onto a search table of one of a plurality of automatic guided vehicles;
    determining one of a plurality of security inspection stations at which to transport each of the luggage items, respectively, based on a bag ID of the luggage item, the bag ID comprising information related to at least one of: flight departure time, flight destination, and a risk based security level that corresponds with the luggage item;
    transporting the plurality of luggage items each from the entrance mechanism to the determined one of the plurality of security inspection stations with the luggage disposed on the search table of the automatic guided vehicle;
    conducting a security inspection of each of the luggage items at the determined security inspection station with the luggage item disposed on the search table of the automatic guided vehicle; and
    wherein a transportation distance between the entrance mechanism and each of the plurality of security inspection stations is independent of conveyors.

2. A method as set forth in claim 1 further including programming the bag ID associated with each luggage item into a control system, and transmitting instructions to the automatic guided vehicles from the control system to transport the luggage items to the determined security inspection stations.

3. A method as set forth in claim 1 further including determining a secondary destination for each of the luggage items based on the inspection of the luggage item at the security inspection station, programming the secondary destination into the control system, and transmitting instructions to the automatic guided vehicle from the control system to transport the luggage item to the determined secondary destination.

4. A method as set forth in claim 3 further including transporting the luggage item to the secondary destination with the luggage item disposed on the search table of the automatic guided vehicle.

5. A method as set forth in claim 4 wherein the secondary destination is at least one of: a clear bag conveyor line, a re-inspection conveyor line and failed bag area.

6. A method as set forth in claim 4 wherein each of the automatic guided vehicles further includes a chassis presenting a plurality of wheels for establishing movement of the automatic guided vehicle, the search table of each of the automatic guided vehicles is pivotable relative to the chassis, and wherein said method further includes unloading each of the luggage item onto a conveyor line at the secondary destination by pivoting the search table relative to the chassis to cause the luggage item to slide off of the search table onto the conveyor line.

7. A method as set forth in claim 1 wherein each of the automatic guided vehicles further includes a chassis presenting a plurality of wheels for establishing movement of the automatic guided vehicle, wherein the search table of each of the automatic guided vehicles extends along a plane in alignment with and above the chassis, wherein the search table is moveable relative to the chassis, and said method further includes the step of moving the search table relative to the chassis in a direction perpendicular to the plane of the search table prior to conducting an inspection of the luggage item to optimize the height of the search table for the inspection station.

8. A method of operating a checked bag reconciliation area as set forth in claim 1 wherein loading a plurality of luggage items from an entrance mechanism each onto a search table of one of a plurality of automatic guide vehicles includes moving the automatic guided vehicles to a position in which the automatic guided vehicle is adjacent to an end of the entrance mechanism and vertically lower than the entrance mechanism, and pushing the luggage item onto the search table.

9. A method of operating a checked bag reconciliation area as set forth in claim 8 wherein the entrance mechanism is a conveyor.

10. A method of operating a checked bag reconciliation area, said method including:
    moving a plurality of luggage items each from an entrance mechanism to a search table of one of a plurality of automatic guided vehicles;
    programming a plurality of bag IDs into a control system, wherein the bag IDs each includes information related to at least one of: flight departure time, flight destination, and a risk based security level that corresponds with the luggage item;
    determining one of a plurality of security inspection stations to transport each of the luggage items based on the bag ID associated with each respective luggage item;
    transmitting instructions to the automatic guided vehicles from the control system to transport the luggage items to the determined security inspection stations;
    transporting the luggage items to the determined security inspection stations with the luggage items each disposed on the search table of one of the automatic guided vehicles; and
    conducting a security inspection of the luggage items at the determined security inspection stations with the luggage items disposed on the search tables of the automatic guided vehicles;
    wherein a transportation between the entrance mechanism and each of the plurality of security inspection stations is independent of conveyors to provide increased floor space within the checked bag reconciliation area.

11. A method as set forth in claim 10 further including determining a secondary destination for each of the luggage items based on the inspections of the luggage items, programming the secondary destinations into the control system, and transmitting the instructions to the automatic guided vehicles from the control system to transport the luggage items to the secondary destinations.

12. A method as set forth in claim 11 further including transporting the luggage items to the secondary destinations with the luggage items disposed on the search tables of the automatic guided vehicles.

13. A method as set forth in claim 12 wherein each of the secondary destinations is at least one of: a re-inspection conveyor line and failed bag area.

14. A method as set forth in claim 12 wherein each of the automatic guided vehicles further includes a chassis presenting a plurality of wheels for establishing movement of the automatic guided vehicle, the search table is pivotable relative to the chassis, and wherein said method further includes unloading the luggage item onto a conveyor line at the secondary destination by pivoting the search table relative to the chassis to cause the luggage item to slide off of the search table onto the conveyor line.

15. A method as set forth in claim 10 wherein each of the automatic guided vehicles further includes a chassis presenting a plurality of wheels for establishing movement of the automatic guided vehicle, the search table extends along a plane in alignment and above the chassis and is moveable relative to the chassis, and said method further includes moving the search table relative to the chassis in a direction being perpendicular to the plane of the search table prior to conducting an inspection of the luggage item to optimize the height of the search table for the inspection station.

16. A system for operating a checked bag reconciliation area, said system comprising:
    an entrance mechanism wherein luggage items are received into the checked baggage reconciliation area;
    a plurality of security inspection stations each spaced from the entrance mechanism;
    a plurality of pathways extending between said entrance mechanism and said plurality of security inspection stations;
    a plurality of automatic guided vehicles each including a chassis having a plurality of wheels for establishing movement of said automatic guided vehicle and a search table connected to said chassis for transporting the luggage items between said entrance conveyor and said security inspection stations with the luggage items disposed on said search table and for allowing the luggage items to be inspected while the luggage items are positioned on said search tables;
    a control system wirelessly connected to said automatic guided vehicles for controlling the movement of said automatic guided vehicles along said at least one pathway between said entrance mechanism and said plurality of security inspection stations;
    a transportation between said entrance mechanism and each of said plurality of security inspection stations along said pathways is independent of conveyors to provide increased floor space within the checked bag reconciliation area.

17. A system as set forth in claim 16 wherein said search table of each of said automatic guided vehicles extends along a plane and is moveable in a direction perpendicular to said plane of said search table for adjusting the height of said search table such that it is at an optimal height for said inspection station.

18. A system as set forth in claim 17 wherein said search table is pivotally mounted on said chassis for allowing said search table to be pivoted relative to said chassis to slide the luggage items off of said search table.

19. A system as set forth in claim 16 wherein said automatic guided vehicles each further includes a proximity sensor for detecting objects proximal to said automatic guided vehicle and stopping said automatic guided vehicle in response to said detection.

20. A method of operating an activity area, said method including:
    moving a plurality of luggage items each from an entrance mechanism to one of a plurality of automatic guided vehicles with the luggage item located at a first location in the activity area;
    providing instructions from a control system to the automatic guided vehicle to move the luggage item from the first location to one of a plurality of security inspection stations in the activity area;
    transporting the luggage item from the first location to the one of a plurality of security inspection stations with the automatic guided vehicle and with the luggage item disposed on the automatic guided vehicle;

conducting a security inspection of the luggage items at the security inspection stations with the luggage items disposed on the automatic guided vehicles;

determining a secondary destination to transport each of the luggage items to based on the security inspections of the luggage items;

providing instructions from the control system to the automatic guided vehicles to move the luggage items from the security inspection stations to the determined secondary destinations; and transporting the luggage items to the determined secondary destinations with the automatic guided vehicles with the luggage items disposed on the automatic guided vehicles;

wherein a transportation between the entrance mechanism and each of the plurality of security inspection stations is independent of conveyors to provide increased floor space within the checked bag reconciliation area.

21. A method of operating a checked bag reconciliation area as set forth in claim 20 wherein said method further includes transporting the luggage item from the first location directly to the secondary destination along a bypass search segment.

22. A system for operating a checked bag reconciliation area, said system comprising:

an entrance mechanism wherein a plurality of luggage items are received into the checked baggage reconciliation area;

plurality of security inspection stations spaced from the entrance mechanism;

a plurality of automatic guided vehicles each including an inspection surface for supporting at least one of the plurality of luggage items on said inspection surface and transporting the at least one luggage item between said entrance mechanism and one of said security inspection stations with the at least one luggage item supported by said inspection surface and for allowing the at least one luggage item to be inspected while the at least one luggage items is supported by said inspection surface; and a control system wirelessly connected to said automatic guided vehicles for automatically controlling the movement of said automatic guided vehicles;

a transportation between said entrance mechanism and each of said plurality of security inspection stations being independent of conveyors to provide increased floor space within the checked bag reconciliation area.

23. A method of operating a checked bag reconciliation area, said method including:

moving a plurality of luggage items each from an entrance mechanism to one of a plurality of automatic guided vehicles;

transmitting a plurality of first inputs to a control system, wherein each of the first inputs is related to at least one of: bag ID information related to at least one of: flight departure time, flight destination, and a risk based security level that corresponds with the luggage items or a condition in the checked bag reconciliation area;

determining one security inspection station of a plurality of security inspection stations to transport each of the luggage items to based on the first inputs;

providing instructions from the control system to the automatic guided vehicles to move from the first location to the determined security inspection stations; and transporting each of the luggage item from the first location to the determined security inspection stations with the luggage item disposed on the automatic guided vehicles;

wherein a transportation distance between the entrance mechanism and each of the plurality of security inspection stations is independent of conveyors to provide increased floor space within the checked bag reconciliation area.

24. A method of operating a checked bag reconciliation area, said method including:

moving a plurality of luggage items each from an entrance mechanism to a search table of one of a plurality of automatic guided vehicles;

transmitting a plurality of first inputs to a control system each corresponding to one of the plurality of luggage items, wherein the first inputs each relate to at least one of: bag ID information related to the luggage item and a condition in the checked bag reconciliation area;

moving the plurality of the automatic guided vehicles with the luggage items disposed on the search tables of the automatic guided vehicles to a staging area being spaced from the entrance mechanism;

determining an inspection station at which to send each of the automatic guided vehicles based on the first inputs while the plurality of automatic guided vehicles are positioned at the staging area;

determining an order of priority of movement of the plurality of automatic guided vehicles based on the first inputs while the plurality of automatic guided vehicles are positioned at the staging area;

providing instructions from the control system to the plurality of automatic guided vehicles to each move to the determined security inspection stations in the determined order of priority of movement, wherein the plurality of inspection stations are spaced from the entrance mechanism and the staging area;

transporting the luggage items from the staging area to the determined security inspection stations in the determined order of priority of movement with the luggage items each disposed on one of the plurality of automatic guided vehicles; and conducting a security inspection on each of the luggage items at the security inspection stations with the luggage items each disposed on the search table of one of the automatic guided vehicle;

wherein a transportation distance between the entrance mechanism and each of the plurality of security inspection stations is independent of conveyors to provide increased floor space within the checked bag reconciliation area.

25. A system for operating a checked bag reconciliation area, said system comprising:

an entrance mechanism wherein luggage items are received into the checked bag reconciliation area;

a plurality of security inspection stations each spaced from the entrance mechanism by a transportation distance;

a plurality of automatic guided vehicles each including an inspection surface for supporting at least one of the luggage items on said inspection surface and transporting the at least one luggage item between said entrance mechanism and said security inspection station along said transportation distance with the at least one luggage item supported by said inspection surface and for allowing the at least one luggage item to be inspected while the at least one luggage items is supported by said inspection surface;

said transportation distance between said entrance mechanism and said plurality of security inspection stations being independent of conveyors; and a control system wirelessly connected to said material handling device for automatically controlling the movement of said automatic guided vehicles and for determining a security inspection station at which to transport each of the luggage items based on a bad ID of the luggage item, the bag ID comprising information related to at least one of: flight departure time, flight destination, and a risk based security level that corresponds with the luggage item.

26. A system for prioritizing an automated movement of a plurality of luggage items in a checked bag reconciliation area, comprising:

a data store comprising a computer readable medium storing a program of instructions for the prioritizing the automated movement;

a processor that executes the program of instructions;

a luggage information receiver configured to receive data associated with each of the plurality of luggage items;

a luggage classifier configured to correspond the received data with priority data, the priority data being assigned to each of the plurality of luggage items;

an instructions communicator configured to communicate the priority data to a system for operating the checked bag reconciliation area, wherein the plurality of luggage items is processed via the checked bag reconciliation area in a predetermined order based on the priority data;

an entrance mechanism wherein the plurality of luggage items are received into the checked baggage reconciliation area;

a plurality of automatic guided vehicles electrically connected to the instructions communicator, each for receiving at least one of the luggage items from the entrance mechanism and for carrying the at least one of the luggage items; and a plurality of security inspection stations;

wherein instructions are transmitted from the instructions communicator to the automatic guided vehicles to transport each of the luggage items to a determined security inspection station, wherein the security inspection station is determined based on the priority data associated with each luggage item;

wherein a transportation distance between the entrance mechanism and each of the plurality of security inspection stations is independent of conveyors to provide increased floor space within the checked bag reconciliation area.

27. A method of operating a checked bag reconciliation area, said method including:

transporting a plurality of luggage items each from an entrance mechanism to one of a plurality of security inspection stations;

wherein the one of the plurality of security inspection stations is determined based on the security inspection station currently being free of automatic guided vehicles;

wherein the one of the plurality of security inspection stations is further determined based on a bag ID of the luggage item, the bag ID comprising information related to at least one of: flight departure time, flight destination, and a risk based security level that corresponds with the luggage item;

conducting an inspection of the luggage items at the determined security inspection stations; and wherein transporting a plurality of luggage items each from an entrance mechanism to one of a plurality of security inspection stations includes transporting the luggage items to the security inspection stations with the luggage items each disposed on a search table of one of a plurality of automatic guided vehicle, and wherein conducting an inspection of the luggage items includes conducting the inspection of the luggage items while the luggage items are disposed on the search tables of the automatic guided vehicles, and wherein the inspection is conducted independent of an agent;

wherein a transportation distance between the entrance mechanism and each of the plurality of security inspection stations is independent of conveyors to provide increased floor space within the checked bag reconciliation area.

* * * * *